(12) United States Patent
Chen et al.

(10) Patent No.: US 11,527,156 B2
(45) Date of Patent: Dec. 13, 2022

(54) LIGHT EMITTING COMPONENT-WISE TRAFFIC LIGHT STATE, SIGNAL, AND TRANSITION ESTIMATOR

(71) Applicant: TOYOTA RESEARCH INSTITUTE, INC., Los Altos, CA (US)

(72) Inventors: Kun-Hsin Chen, Los Altos, CA (US); Hai Jin, Los Altos, CA (US); Shunsho Kaku, Mountain View, CA (US); Takaaki Tagawa, Mountain View, CA (US); Ryan W. Wolcott, Ann Arbor, MI (US); Hiroshi Yasuda, San Francisco, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 65 days.

(21) Appl. No.: 16/984,006

(22) Filed: Aug. 3, 2020

(65) Prior Publication Data
US 2022/0036732 A1 Feb. 3, 2022

(51) Int. Cl.
*G08G 1/0962* (2006.01)
*G08G 1/0967* (2006.01)
(Continued)

(52) U.S. Cl.
CPC ..... *G08G 1/09623* (2013.01); *B60W 60/0016* (2020.02); *G06T 7/60* (2013.01);
(Continued)

(58) Field of Classification Search
CPC ......... G08G 1/09623; G08G 1/096725; G08G 1/096827; G08G 1/096877; G08G 1/0969;
(Continued)

(56) References Cited

U.S. PATENT DOCUMENTS 8,134,480 B2 * 3/2012 Onome ............. G06K 9/00825
340/937
9,145,140 B2 * 9/2015 Ferguson ........... G06K 9/00825
(Continued)

FOREIGN PATENT DOCUMENTS

CN 111079563 4/2020

OTHER PUBLICATIONS

Fairfield et al., "Traffic Light Mapping and Detection," IEEE International Conference on Robotics and Automation, 2011.
(Continued)

*Primary Examiner* — Dale W Hilgendorf
(74) *Attorney, Agent, or Firm* — Sheppard, Mullin, Richter & Hampton, LLP; Hector A. Agdeppa; Daniel N. Yannuzzi

(57) ABSTRACT

Systems and methods of traffic light detection/perception are provided for detecting traffic lights states and/or transitions for different traffic light layouts. Basic traffic light information can be obtained regarding, e.g., the existence of a traffic light(s) at an intersection being approached by a vehicle, and which bulb(s) may apply to/control a particular lane of traffic at the intersection. Based on that information, bulb-specific or bulbwise detection can be performed. Upon determining the existence of a traffic light, specific bulbs within or making up the traffic light can be detected, and their various states can be predicted or estimated relative to a corresponding bulb group. The various states can then be simplified and output as a message(s) upon which autonomous control of a vehicle can be based.

18 Claims, 9 Drawing Sheets

(51) Int. Cl.

| | |
|---|---|
| *B60W 60/00* | (2020.01) |
| *G06T 7/60* | (2017.01) |
| *G06V 10/22* | (2022.01) |
| *G06V 10/56* | (2022.01) |
| *G06V 20/58* | (2022.01) |
| *G08G 1/0969* | (2006.01) |
| *G08G 1/0968* | (2006.01) |

(52) U.S. Cl.
CPC .............. *G06V 10/22* (2022.01); *G06V 10/56* (2022.01); *G06V 20/584* (2022.01); *G08G 1/096725* (2013.01); *G06T 2207/30252* (2013.01); *G08G 1/0969* (2013.01); *G08G 1/096827* (2013.01); *G08G 1/096877* (2013.01)

(58) Field of Classification Search
CPC .......... B60W 60/0016; G06K 9/00825; G06K 9/2054; G06K 9/4652; G06T 7/60; G06T 2207/30252; G06V 10/22; G06V 10/56; G06V 20/584
See application file for complete search history.

(56) References Cited

U.S. PATENT DOCUMENTS

| | | | | |
|---|---|---|---|---|
| 9,442,487 | B1* | 9/2016 | Ferguson | G06K 9/6277 |
| 10,139,832 | B2* | 11/2018 | Sarkar | G06K 9/00825 |
| 10,525,903 | B2* | 1/2020 | Laur | G06K 9/00825 |
| 2011/0182475 | A1* | 7/2011 | Fairfield | G05D 1/0212 |
| | | | | 382/104 |
| 2014/0010416 | A1 | 1/2014 | Tanaka | |
| 2014/0309789 | A1* | 10/2014 | Ricci | G06V 20/59 |
| | | | | 700/276 |
| 2015/0153735 | A1* | 6/2015 | Clarke | B62D 15/025 |
| | | | | 701/301 |
| 2016/0371552 | A1* | 12/2016 | Oki | G06V 20/584 |
| 2017/0262709 | A1* | 9/2017 | Wellington | G06V 20/584 |
| 2018/0218226 | A1 | 8/2018 | Wellington | |
| 2018/0285664 | A1* | 10/2018 | Satyakumar | G06V 20/584 |
| 2019/0256108 | A1* | 8/2019 | Emura | G06V 20/584 |
| 2020/0008145 | A1 | 1/2020 | Tang | |
| 2020/0133283 | A1* | 4/2020 | Hirano | G06K 9/00825 |
| 2021/0156704 | A1* | 5/2021 | Gibson | G06K 9/00825 |
| 2021/0201057 | A1* | 7/2021 | Lin | G06K 9/6267 |
| 2021/0201058 | A1* | 7/2021 | Artamonov | G06K 9/00825 |
| 2022/0114375 | A1* | 4/2022 | Chen | G06V 20/584 |

OTHER PUBLICATIONS

Müller et al., "Detecting Traffic Lights by Single Shot Detection," arXiv:1805.02523v3 [cs.CV] Oct. 11, 2018.

Possatti et al., "Traffic Light Recognition Using Deep Learning and Prior Maps for Autonomous Cars," arXiv:1906.11886v1 [cs.CV] Jun. 4, 2019.

Yoneda et al., "Robust Traffic Light and Arrow Detection Using Digital Map with Spatial Prior Information for Automated Driving," Sensors (Basel). 2020;20(4):1181. Published Feb. 21, 2020. doi:10.3390/s20041181.

* cited by examiner

LIGHT EMITTING COMPONENT-WISE TRAFFIC LIGHT STATE, SIGNAL, AND TRANSITION ESTIMATOR

TECHNICAL FIELD

The present disclosure relates generally to systems and methods for traffic light detection to control autonomous vehicle operation.

DESCRIPTION OF RELATED ART

Traffic light handling or perception is a fundamental capability required in autonomous driving, especially in urban environments, where traffic lights can be encountered rather frequently, e.g., every block. In order for autonomous vehicles, or even vehicles using assisted driving systems, e.g., advanced assisted driving systems (ADAS), to traverse roadways with traffic lights, those traffic lights must be accurately perceived so that the traffic flow they control can progress properly.

BRIEF SUMMARY OF THE DISCLOSURE

In accordance with one embodiment, a method comprises generating images of a traffic light, and detecting current characteristics of each bulb of a plurality of bulbs comprising the traffic light based on the images. The method further comprises temporally filtering the current characteristics of each bulb in one or more bulb groups to refine the detected current characteristics, and outputting one or more bulb-specific states regarding the one or more bulb groups.

In some embodiments, the method further comprises generating an autonomous vehicle navigation plan based on the one or more bulb-specific states.

In some embodiments, the generating of the images comprises projecting information regarding the traffic light from a high definition (HD) map onto a plurality of in-vehicle camera-captured images of the traffic light. In some embodiments, the one or more bulb groups are defined in the HD map. In some embodiments, the one or more bulb groups are defined relative to a lane or lanes of roadway controlled by the traffic light. In some embodiments, the detecting of the current characteristics comprises determining a data intersection between each bulb of each of the one or more bulb groups and characteristics identified via the in-vehicle camera-captured images. In some embodiments, the method further comprises applying an optional bulb-specific filter refining accuracy of the current characteristics.

In some embodiments, the detecting of the current characteristics further comprises detecting at least one of a bounding box location, a color, a geometry, a flashing state, an angular direction, and an activation state.

In some embodiments, the temporally filtering of the current characteristics comprises applying a bulb group filter to filter out erroneously detected characteristics. In some embodiments, the bulb group filter is designed based on regional traffic light bulb color transitions.

In some embodiments, the outputting of the one or more bulb-specific states comprises a simplified bulb state upon which one or more autonomous control signals is based. In some embodiments, the simplified bulb state comprises a go-no-go state for each of the one or more bulb groups.

In some embodiments, a vehicle comprises a camera, and a bulb-specific detector. In some embodiments, the bulb detector comprises a bulb detector component detecting current characteristics of each bulb of a plurality of bulbs comprising the traffic light based on images captured by the camera. The bulb detector component further comprises a post processor translating the current characteristics of each bulb into bulb group-based characteristics. Further still, the bulb detector component comprises a temporal filter filtering out erroneous predictions of the current characteristics. The vehicle further comprises an autonomous control system receiving bulb-specific output messages from the bulb-specific detector upon which autonomous control signals for controlling the vehicle are based.

In some embodiments, the vehicle comprises a map database storing map information including location information regarding the traffic light and bulb group information regarding the traffic light. In some embodiments, the map information regarding the traffic light and bulb group information is overlaid onto the images captured by the camera to create image thumbnails for analysis by the bulb detector component for the detecting of the current characteristics of each bulb.

In some embodiments, the post processor matches the current characteristics to each bulb of one or more bulb groups based on the bulb group information.

In some embodiments, the temporal filter filters out erroneous bulb-group-specific characteristics in accordance with known traffic light bulb translations particular to a region bring traveled by the vehicle.

In some embodiments, the bulb-specific detector further comprises a bulbwise filter filtering our erroneous detected characteristics of each bulb.

In some embodiments, the bulb-specific detector outputs simplified bulb-group-specific characteristics to the autonomous control system.

In some embodiments, the current characteristics comprise at least one of a bounding box location, a color, a geometry, a flashing state, an angular direction, and an activation state.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

As alluded to above, vehicles such as autonomous vehicles and ADAS-equipped vehicles should be able to accurately perceive traffic lights encountered on roadways that such vehicles traverse. One way to address traffic light perception can be to employ machine learning to train models so that the models will be able to accurately perceive different traffic light states, for example. However, conventional traffic light perception models are often premised on traffic light state and transition models for limited traffic light layouts. For example, conventional traffic light perception models may be limited to traffic lights that have "simple" vertical or horizontal layouts, e.g., a single column/row of three bulbs. Unfortunately, such traffic light perception models are incapable of detecting/perceiving traffic lights with alternative layouts or bulb configurations/states, such as those that can be found in other countries or regions.

Accordingly, various embodiments are directed to systems and methods of traffic light detection/perception, in particular, detecting traffic lights states and/or transitions for different traffic light or traffic signal layouts in any region. In some embodiments, the ability to detect/perceive traffic lights includes obtaining from a map, basic traffic light information, e.g., the existence of a traffic light(s) at an intersection being approached by a vehicle, and which bulb(s) (also referred to as a bulb group) may apply to/control a particular lane of traffic at the intersection. Based on that map information, bulb-specific or bulbwise detection can be performed. That is, upon determining the existence of a traffic light, specific bulbs within or making up the traffic light can be detected, and their various states can be predicted or estimated relative to a corresponding bulb group. The various states can then be simplified and output as a message(s) upon which autonomous control of a vehicle can be based.

It should be understood that the terms "traffic light(s)" and "traffic signal(s)" may be used interchangeably in the present disclosure. A traffic light/signal can refer to any signaling device positioned at road intersections, pedestrian crossings, and other locations for controlling the flow of vehicular traffic. Although various embodiments are described in the present disclosure in the context of automotive vehicles/traffic, various embodiments have applicability in other contexts where traffic light perception is needed or performed.

Figure 1:
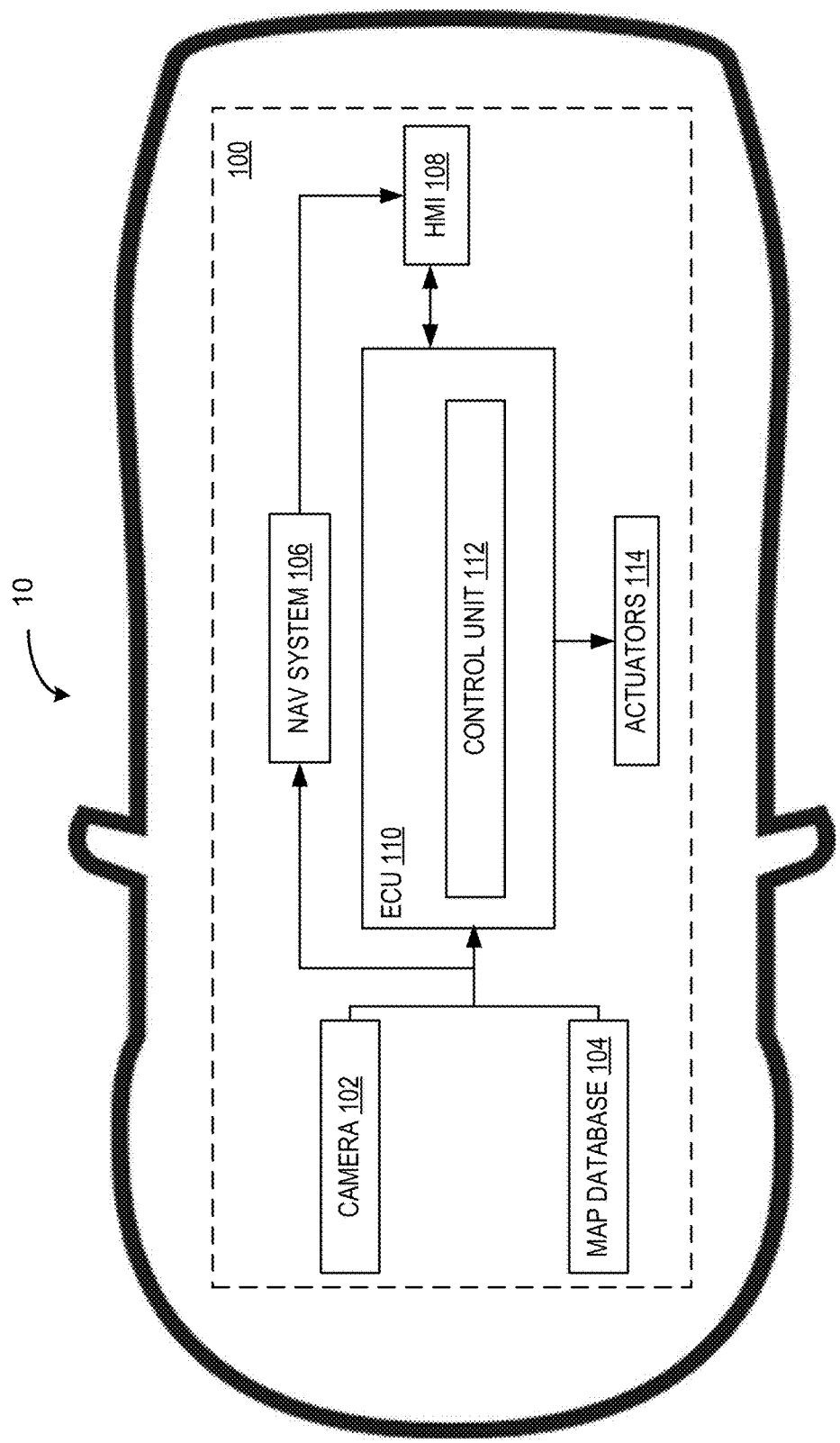
FIG. 1 illustrates an example vehicle with which data for training a traffic light perception model may be captured and in which traffic light perception may be performed.

FIG. 1 illustrates an example vehicle 10 that may necessitate the ability to handle/perceive traffic lights, such as an autonomous vehicle, mapping vehicle, etc. It should be understood that various embodiments disclosed herein may be applicable to/used in various vehicles (internal combustion engine (ICE) vehicles, fully electric vehicles (EVs), etc.) that are fully or partially autonomously controlled/operated.

It should be understood that a vehicle such as vehicle 10 may have some form of a drive force unit (e.g., an engine, motor generators (MGs)), a battery, a transmission, a memory, an electronic control unit (ECU), and/or other components not necessarily illustrated herein. However, some relevant components are described below.

FIG. 1 illustrates an example autonomous control system 100 that may be used to autonomously control vehicle 10. Autonomous control system 100 may be installed in vehicle 10, and executes autonomous control of vehicle 10. As described herein, autonomous control can refer to control that executes driving/assistive driving operations such as acceleration, deceleration, and/or steering of a vehicle, generally movement of the vehicle, without depending or relying on driving operations/directions by a driver or operator of the vehicle.

As an example, autonomous control may include a lane keeping assist control where a steering wheel (not shown) is steered automatically (namely, without depending on a steering operation by the driver) such that vehicle 10 does not depart from a running lane. That is, the steering wheel is automatically operated/controlled such that vehicle 10 runs along the running lane, even when the driver does not perform any steering operation.

An ECU 110 may include circuitry to control the above aspects of vehicle operation. ECU 110 may include, for example, a microcomputer that includes a one or more processing units (e.g., microprocessors), memory storage (e.g., RAM, ROM, etc.), and I/O devices. ECU 110 may execute instructions stored in memory to control one or more electrical systems or subsystems in the vehicle. ECU 110 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., anti-lock braking system (ABS) or electronic stability control (ESC)), battery management systems, and so on. These various control units can be implemented using two or more separate electronic control units, or using a single electronic control unit.

In the example shown in FIG. 1, autonomous control system 100 is provided with a plurality of sensors, such as one or more external sensors (one of which may be a camera 102, a Global Positioning System (GPS) reception unit (not shown), an internal sensor(s) (not shown), a map database 104, a navigation system 106, an HMI (Human Machine Interface) 108, and actuators 114. Autonomous control system 100 may communicate with ECU 110, or in some embodiments (may be implemented with its own ECU).

In the example shown in FIG. 1, the aforementioned external sensors, one of which may be embodied as camera 102, can be detectors or part of a detector(s) that detect external circumstances such as surrounding information of vehicle 10.

Camera 102 may be an imaging device that images the external circumstances surrounding vehicle 10. For example, camera 102 can be provided on a back side of a front windshield of vehicle 10, and camera 102 may be a monocular camera or a stereo camera, a still camera, a video camera, a color camera, etc. Vehicle 10 may have multiple cameras located in different areas of vehicle 10. Such cameras, including camera 102 may output, to the ECU 110, image information regarding the external circumstances surrounding vehicle 10. In the context of traffic light perception, camera 102 may detect and capture one or more images that ultimately may be determined to be a traffic light that is processed to determine the status/characteristics of the traffic light.

A map database 104 may be a database including map information, such as a high definition (HD) map database. The map database 104 is implemented, for example, in a disk drive or other memory installed in vehicle 10. The map information may include road position information, road shape information, intersection position information, and fork position information, for example. The road shape information may include information regarding a road type such as a curve and a straight line, and a curvature angle of the curve. When autonomous control system 100 uses a Simultaneous Localization and Mapping (SLAM) technology or position information of blocking structural objects such as buildings and walls, the map information may further include an output signal from an external sensor, such as camera 102. In some embodiments, map database 104 may be a remote data base or repository with which vehicle 10 communicates. In some embodiments, map database 104 may further include information regarding the existence and, e.g., general location/position of a traffic light(s) along roads, at intersections, etc. It should be understood that map database 104 may be resident in vehicle 10 or may be implemented at a remote server and accessed by autonomous control system 100.

Navigation system 106 may be a component or series of interoperating components that guides vehicle 10 to a destination on a map designated in map database 104, for example. That is, navigation system 106 may calculate a route followed or to be followed by vehicle 10, based on the position information of vehicle 10 measured by the aforementioned GPS reception unit and map information of map database 104. The route may indicate a running lane of a section(s) of roadway in which vehicle 10 traverses, for example. Navigation system 106 calculates a target route from the current position of vehicle 10 to the destination, and notifies a passenger of vehicle 10, for example, of the target route through a display, e.g., a display of a head unit, which may be an embodiment of HMI 108. The navigation system 106 outputs, to the ECU 110, information of the target route for vehicle 10. In some embodiments, navigation system 106 may use information stored in a remote database, like map database 104, and/or some information processing center with which vehicle 10 can communicate. A part of the processing executed by the navigation system 106 may be executed remotely as well.

ECU 110 may execute autonomous control of the vehicle, and may include, among other components, a control unit 112. Control unit 112 can autonomously control vehicle 10 based on the navigation plan generated by a navigation plan generation unit (not shown). The navigation plan can include navigation instructions/actions relevant to and/or depending on the state(s) of various traffic lights that vehicle 10 encounters or will encounter as it travels along a road, along a lane of a road, as it transitions from one lane to another lane, as it transitions from one road to another road, and so on. The control unit 112 outputs, to the actuators 114, control signals according to the navigation plan. That is, the control unit 112 controls actuators 114 based on the navigation plan, and thereby autonomously controls one or more aspects of vehicle 10 to traverse one or more roadways in accordance with the navigation plan. Actuators 114 may comprise one or more interfaces to, e.g., drive units of vehicle 10, e.g., a throttle that controls engine operation.

Figure 2A:
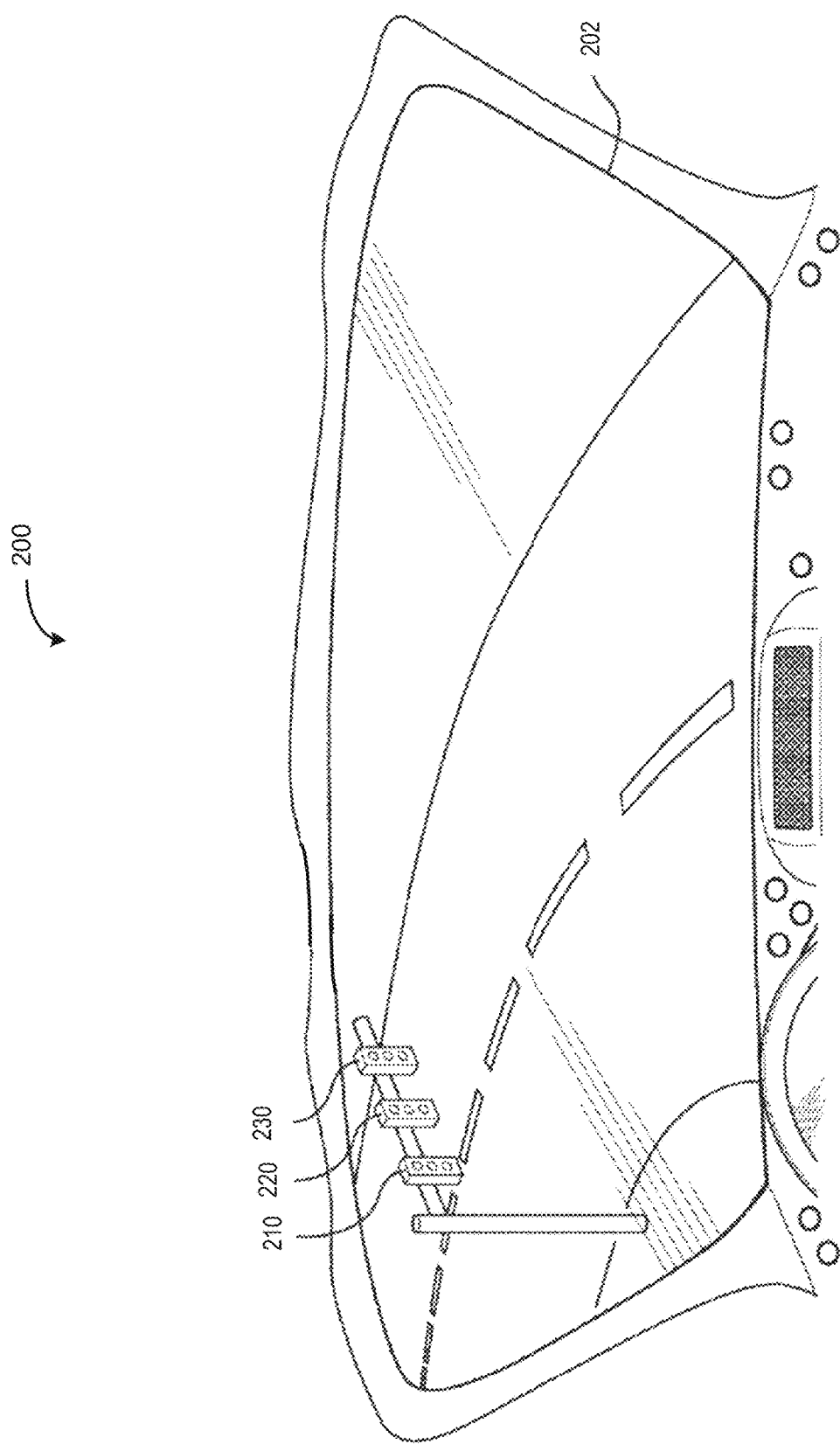
FIG. 2A is an example view of traffic lights from a vehicle.

FIG. 2A is an example view 200 from a vehicle, such as vehicle 10 of FIG. 1, approaching traffic signals 210, 220, 230 at a curve in a road on which vehicle 10 is travelling. A camera or other image capture device, such as camera 102, may capture an image 202 of the upcoming roadway. Image 202 may reflect the one or more traffic signals 210, 220, 230. A traffic light detection component or detector (described below) of vehicle 10 may create a region of interest in an attempt to detect the state of the traffic signals 210, 220, 230. In this case, three regions of interest about/proximately surrounding traffic signals 210, 220, 230 may be created by the traffic light detection component. Regions of interest may be determined based on previously stored information about the traffic lights depicted in image 202. For example, locations of traffic signals 210, 220, 230 may have been previously mapped and regions of interest may have been associated with locations on the map.

It should be noted that traffic signals can differ from region to region, municipality to municipality, country to country, etc. For example, traffic signals in the United States tend to comprise a generally vertical (although sometimes horizontal) arrangement of three bulbs (or light emitting components such as light emitting diode (LED) arrays arranged in a round, bulb-like shape) one atop another. Typically a red bulb is the top-most bulb, a yellow bulb is the middle bulb, and a green bulb is the bottom bulb. Such traffic signals may cycle through an illumination sequence that can go, e.g., from red (indicating oncoming vehicles should stop) to green (indicating oncoming vehicles may go, e.g., straight) to yellow (indicating oncoming vehicles should slow down to a stop). This cycle may then repeat. Some traffic signals may include another bulb/light such as an green arrow (indicating to oncoming vehicle to turn in the direction of the green arrow). Some traffic signals may only have one bulb/light, such as a red bulb that blinks (indicating that oncoming vehicles should stop, but are then allowed to proceed after checking cross-traffic).

In other countries, such as Japan, for example, traffic signals may be generally oriented in a horizontal fashion, and may include multiple, e.g., two, rows of bulbs/lights. For example, a top row of the traffic signal may have three bulbs or light arrays, the left-most being a green bulb, the middle being a yellow bulb, and the right-most being a red bulb. Below that, a second row, may comprise, e.g., four bulbs/lights. The left-most bulb may be a green diagonal left-down pointing arrow. The next bulb may be a green diagonal left-up pointing arrow. The next bulb may be a green up pointing arrow. The right-most bulb may be a green right-pointing arrow.

Figure 2B:
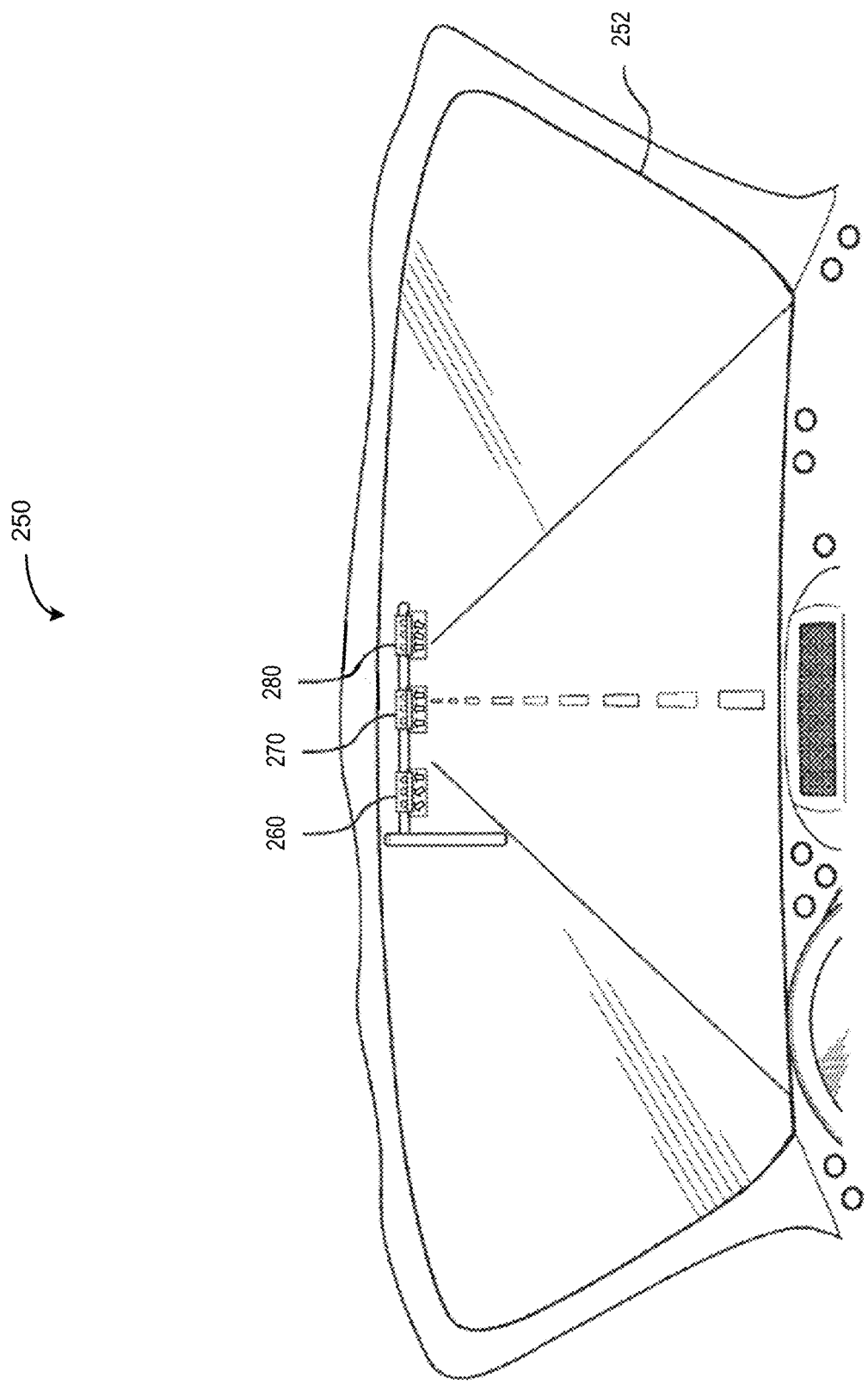
FIG. 2B is another example view of traffic lights from a vehicle.

FIG. 2B is an example view 250 from a vehicle, such as vehicle 10 of FIG. 1, of approaching traffic signals 260, 270, 280 at a curve in a road on which vehicle 10 is travelling. A camera or other image capture device, such as camera 102, may capture an image 252 of the upcoming roadway. Image 252 may reflect the one or more traffic signals 260, 270, 280. A traffic light detection component (described below) of vehicle 10 may create a region of interest in an attempt to detect the state of the traffic signals 260, 270, 280. In this case, three regions of interest about/proximately surrounding traffic signals 260, 270, 280 may be created by the traffic light detection component. Regions of interest may be determined based on previously stored information about the traffic lights depicted in image 252. For example, locations of traffic signals 260, 270, 280 may have been previously mapped and regions of interest may have been associated with locations on the map. Here, traffic signals 260, 270, 280 have characteristics that differ from traffic signals 210, 220, 230, e.g., traffic signals 260, 270, 280 are oriented horizontally as opposed to vertically, and have two rows of bulbs/lights. Moreover, whereas traffic signals 210, 220, 230 comprise solid, round bulb shapes, traffic signals 260, 270, 280 comprise both solid, round, bulb shapes, and additionally, solid, directional arrow shapes.

As will be described below, perceiving traffic signals, such as traffic signals 210, 220, 230, 260, 270, and 280 may involve detecting various characteristics of the traffic signals (upon a determination that a detected object is a traffic signal), and determining certain characteristics indicative of the command(s) the traffic signal intends to relay to vehicles. Shape/geometry as described above with reference to FIGS. 2A and 2B, is one such characteristic, and as alluded to above and further described herein, other characteristics may include color, whether or not a traffic bulb is projecting solid light or is flashing, etc.

Machine learning generally involves developing a model, i.e., a mathematical representation of a real-world process, where the model is able to make predictions about that real-world process. To generate a model, typically, training data is provided or input into a machine learning algorithm by means of a known dataset before application of the model in real-world scenarios or situations. In supervised learning, one method or subset of machine learning, applicable machine learning algorithms are trained on data that has been labeled or classified or otherwise categorized. Therefore, successful implementation of such machine learning algorithms depends on the accuracy with which that labeling/annotation/classification is performed. Ultimately, a model should be able to accurately predict/estimate what a detected traffic signal is conveying, whether in the real world, in a simulation, etc.

While models can be developed and trained to various degrees of accuracy, models that are developed and trained to predict certain types of information (in this case, perceive traffic lights and estimate states or transitions), often perform poorly when presented with scenarios or information outside of that used to train the model. Practically speaking, a model developed and trained to detect and perceive traffic signals in the United States would not likely perform will if used in Japan. Accordingly, conventional approaches rely on developing specific models to address specific scenarios, in this case, specific traffic lights in specific regions.

In order to avoid having to develop particular models for particular scenarios, systems and methods described herein focus on bulbwise detection. That is, each bulb in a traffic light is identified, and a state thereof is predicted. In this way, the same or similar systems and methods for traffic light detection and perception can be used universally, regardless of the layout and/or specific characteristics of a traffic light. In other words, contrary to perceiving a traffic light as a whole, a traffic light can be "parsed" into its component bulbs, and the state of that bulb as well as to what transition, lane, or road characteristic that bulb applies can be determined.

Figure 3A:
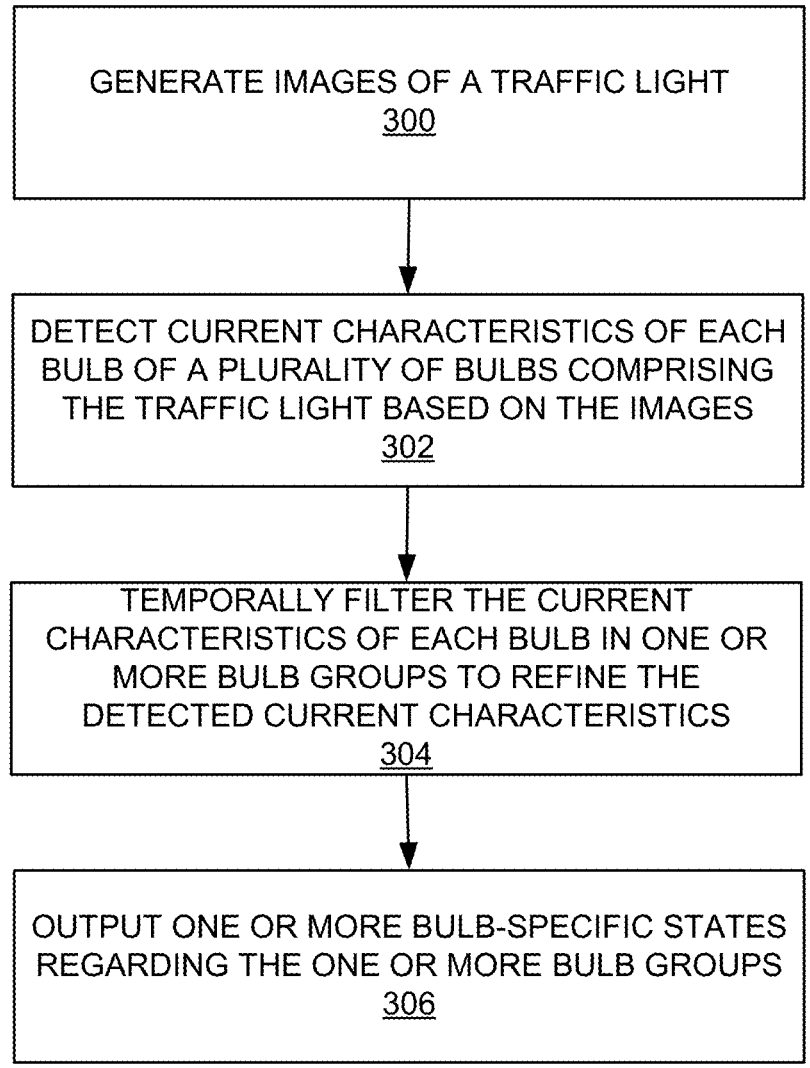
FIG. 3A is a flow chart illustrating traffic light detection and perception in accordance with one embodiment.
Figure 3B:
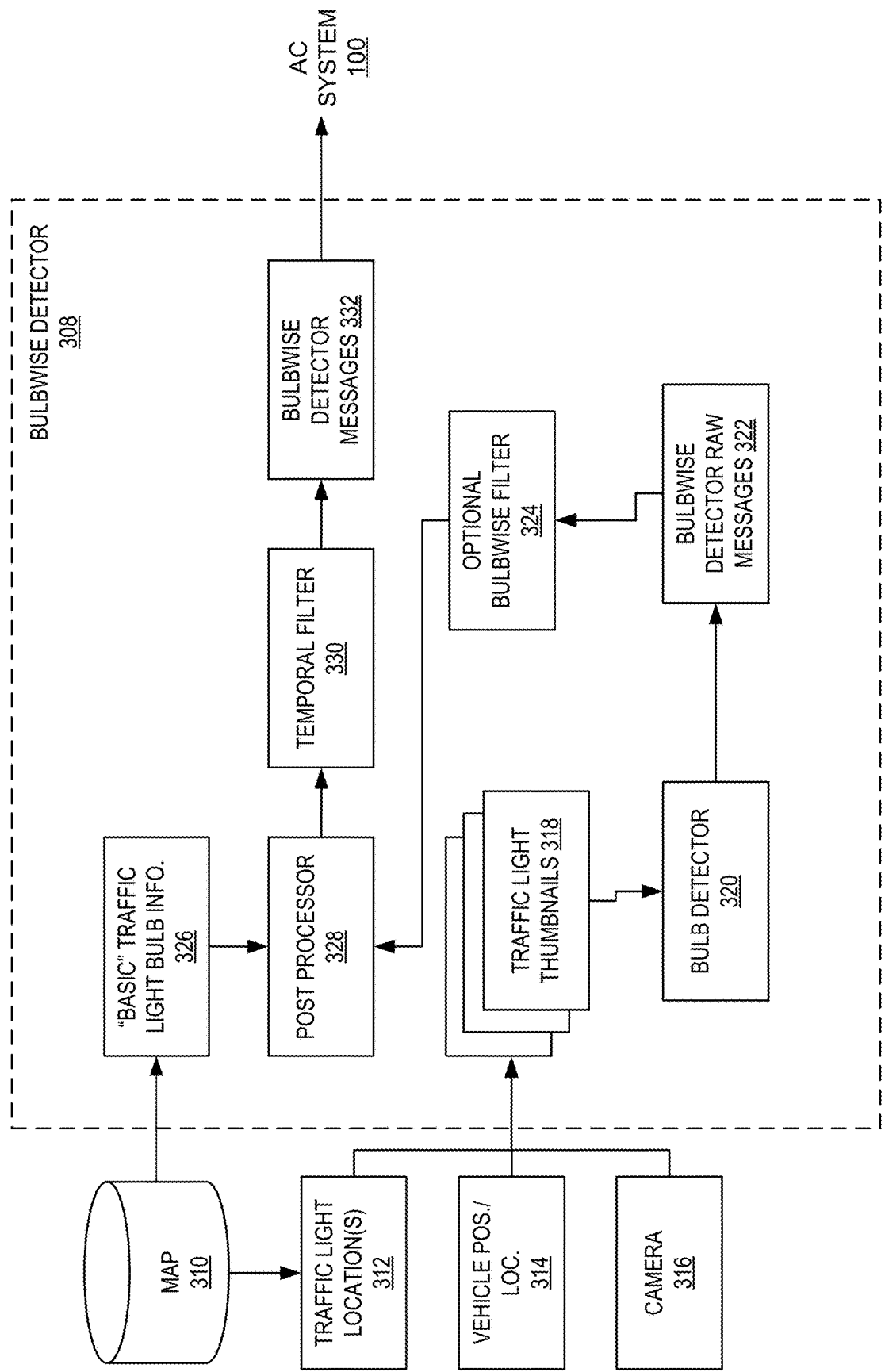
FIG. 3B illustrates an example bulbwise detector in accordance with one embodiment.

FIG. 3A a flow chart illustrating example operations for bulbwise detection in accordance with some embodiments. FIG. 3B illustrates an example system, i.e., bulbwise detector 308, for bulbwise detection in accordance with some embodiments, and will be described in conjunction with FIG. 3A.

Referring now to FIG. 3A, at operation 300, images of a traffic light may be generated. Referring now to FIG. 3B, these traffic light images are reflected as traffic light thumbnails 318. A map database or map information repository 310, which may be an embodiment of map 104 (FIG. 1), as noted above, may include certain, basic information related to traffic lights, such as their existence at an intersection, or roadway. As noted above, in an autonomous driving scenario, a vehicle, such as vehicle 10 described above, may approach an intersection. In order to properly and safely autonomously control vehicle 10 as it traverses the intersection, vehicle 10 may need to detect the existence of a traffic light(s), and properly identify the state of the relevant bulb(s) of that traffic light(s).

Consider for example, a scenario where vehicle 10 approaches an intersection having a go-straight lane (in which vehicle 10 may proceed through the intersection without making any turns) and a left-turn lane (in which vehicle 10 may turn left into another road/street intersecting the road/street that vehicle 10 is currently traveling on). A traffic light may be present at the intersection, where certain bulbs of the traffic light control the left turn lane (such as a red bulb, yellow bulb, and a left turn arrow bulb), while the red and yellow bulbs, along with a green bulb, control the go-straight lane. For purposes of description, these vehicle actions, such as going straight, turning, etc., relative to some section(s) of roadway can be referred to as vehicle transitions or vehicle state transitions.

As also described above, information regarding a vehicle's position/location 314 may be known based on information from navigation system 106, and may be compared to/considered in light of map information from map database 104. That is, based on a determined location and/or position of vehicle 10, it may be determined from map 310, that the aforementioned traffic light exists at the intersection where vehicle 10 is currently located (traffic light location(s) 312). Moreover, the position of vehicle 10, e.g., that vehicle 10 is in the left turn lane at that particular intersection, can also be determined. In this way, the map 310 can be used to glean, initial or basic information regarding any relevant traffic lights that vehicle 10 should consider when generating autonomous control signals for vehicle 10 to implement and follow.

Camera 316 may be an embodiment of camera 102 (FIG. 1), and can be used to take one or more images of any identified traffic signals in the vicinity of vehicle 10. Various mechanisms may be used to determine which traffic signals are relevant to the current operation of vehicle 10. That is, camera 316 may sense traffic signals three or four intersections ahead, but such traffic signals are far enough way that determining bulbwise states may not yet be necessary. In other embodiments, future traffic signals may be sensed and predictions regarding bulbwise state may be performed in order to provide anticipatory information on which autonomous control signals can be based. Thresholds for how far ahead traffic signals are detected/predicted can be programmed/configured as desired.

Upon camera 316 taking one or more images of a traffic signal at the intersection, any relevant traffic light information already known from 310 may be projected onto the camera images to create image thumbnails 318 of that traffic light. In this way, any information known/captured at the moment can be used to help determine/predict a state of the bulbs making up the traffic light.

Referring back to FIG. 3A, at operation 302, current characteristics of each bulb of a plurality of bulbs comprising the traffic based can be detected or determined based on the images. That is, each of the traffic light image thumbnails 318 can be provided as input to a bulb detector 320. Bulb detector 320 may be a machine learning model, such as deep neural network model trained to detect/perceive bulbs of traffic signals. It should be understood that any currently or future-known mechanism(s) can be used as bulb detector 320 to determine additional detail regarding the bulbs of an identified traffic signal(s), such as bulb category, bulb shape, bulb state, angle/direction (of an arrow type or shaped bulb), etc.

As has already been described, understanding the command(s) one or more traffic signals are conveying to vehicles can be a complicated endeavor. Traffic signals may control multiple lanes of traffic, each traffic signal may have multiple bulbs or bulb groups, where one or more bulb groups may be used to control bulb transitions (red to green, green to yellow, etc.). One or more lights, bulb groups, shapes, etc. are factors to consider when vehicle 10 wishes to traverse an intersection, for example.

A traffic light bulb's color state can reflect bulb color characteristics of a bulb that's illuminated, e.g., green, yellow, or red. As alluded to above, in some regions, only one bulb of a traffic signal will be illuminated, and so upon detecting the existence of and labeling an image as a traffic light, the next detection may be detecting the color associated with an illuminated bulb in the detected traffic signal. However, in other regions, multiple bulbs may be illuminated. Again, in Japan, traffic signals may have multiple rows of bulbs, with, e.g., two bulbs, one in each row, being illuminated.

A bulb's geometry or geometric state, e.g., whether the bulb shape is round, an arrow, a particular arrow, an outline of a pedestrian (not shown), a direction of the arrow (also not shown), etc. is another characteristic that can be determined. In this way, an image containing what has been determined/labeled to be a traffic light, and subsequent to detecting/labeling the image as representing a traffic light with an illuminated green bulb, for example, a detector can determine the shape of the illuminated bulb(s).

Yet another characteristic of a traffic signal may be the bulb's flashing state, i.e., whether the bulb that is illuminated is flashing or is solid. As should be understood, certain traffic signals direct vehicular traffic through the use, not only of color and shape, but also by whether or not a traffic light bulb is blinking or not (solid). For example, in the United States, a flashing green bulb on a traffic signal may indicate that that the traffic signal is pedestrian activated, therefore signaling to oncoming vehicles that caution should be used in the event the oncoming vehicles must stop to let a pedestrian cross. In Canada, a flashing green bulb signals to an oncoming vehicle that it is permitted to turn left prior to opposing traffic being allowed to enter the intersection.

As noted above, conventional traffic light detection/perception systems or models tend to focus on an entire traffic light, which may include a particular set of bulbs and/or a particular configuration or layout of bulbs. Accordingly, any machine learning model or mechanism for detecting/perceiving traffic signals are generally specific to a particular type of traffic signal, and thus conventional traffic light detection/perception systems cannot be used across regions, e.g., countries, municipalities, etc. that may have different types traffic signals or traffic signals with different bulb layouts or configurations. In contrast, because various embodiments described herein are directed to bulbwise detection, i.e., detection/perception of individual bulbs (regardless of a traffic light layout/configuration), the various embodiments can be used to detect/perceive traffic light states on a per-bulb basis anywhere. For example, although traffic signals in the Unites States may have, e.g., singular row/column layout, and may only utilize left/right arrows, traffic signals in Japan may have multiple rows of bulbs including diagonal right/up/down/left arrows. Nevertheless, so long as the bulbs and their respective states can be determined/predicted, the layout no longer is a barrier to detection/prediction (as it is with current technologies). Examples of how bulb detector 320 operates to determine the particular characteristics of bulbs of a traffic signal (beyond what may be know from map information) will be described in greater detail below.

Figure 3C:
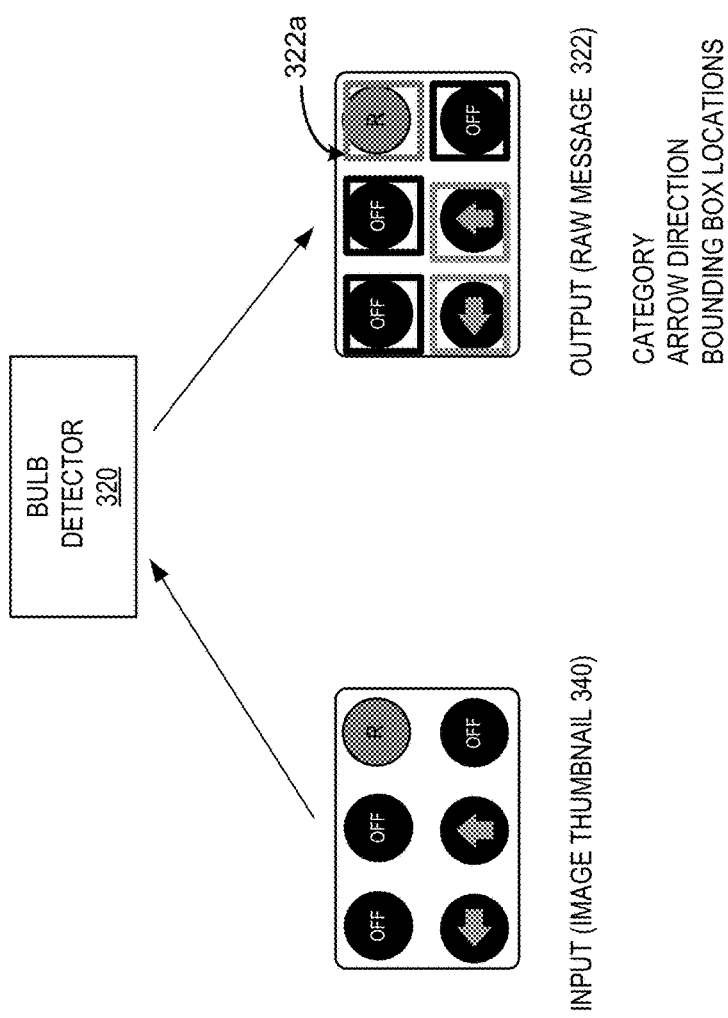
FIG. 3C illustrates an example of current characteristics of a traffic light output by the example traffic light detection and perception system of FIG. 3B.

An example of the input to and output from bulb detector is illustrated in FIG. 3C, where an input may be an image thumbnail 340 representative of a traffic signal of interest to be analyzed by autonomous control system 100 of vehicle 10 in order to determine how to navigate a section(s) of roadway appropriately. For example, image thumbnail 340 may include a traffic signal including two rows of bulbs. A first (top) row may include two non-active bulbs, and an active red bulb. A second (bottom) row may include an active green, left-turn arrow, an active green go-straight arrow, and an inactive bulb.

Upon processing image thumbnail 340 by bulb detector 320, characteristics of each of the bulbs of the traffic signal may be output including, for example: bounding box locations (one example of which is labeled 322a around the active red light in the top row of the traffic light); bulb category; and arrow direction. It should be understood that a boundary (or bounding box) corresponds to delineating region(s) for detecting whether or not some portion of a captured image of a view, e.g., views 200 (FIG. 2A) or 250 (FIG. 2B) includes a traffic light. Bounding boxes/sliding windows can be "slid" across an image and a classifier can check to see if the content within the bounding box is a traffic light(s).

In terms of bulb category, characteristics such as color (e.g., red, green, yellow, or unknown) may be output. Other bulb categories includes type (round, arrow, unknown), as well as state (on, off, blinking, unknown). In terms of arrow (or angle) direction, bulb detector 320 may detect and output the direction of a detected arrow-type bulb, e.g., $$\frac{\pi}{2}, 0, -\frac{\pi}{2}.$$

Returning to FIG. 3B, bulbwise detector "raw" messages 322 can be output as a result of bulb detector 320 detecting the current characteristics of each bulb of a traffic light. In some embodiments, these raw messages 322 may be sent to post processor 328 for comparison with bulb group information maintained as part of the map information of map database 310 (described in greater detail below). However, in accordance with other embodiments, these raw messages 322 may be first processed through an optional bulbwise filter 324. Optional bulbwise filter 324 may be any appropriate filter, e.g., Hidden Markov Model (HMM), spatial tracking, Kalman, etc. now or later-known, or any combination thereof. Optional bulbwise filter 324 may be used to filter out any false bulb-specific determinations/detections. That is, camera 316 may be operating at some given frame rate, e.g., 20 fps, and thus, captures multiple images/frames of a traffic signal of interest. For example, consider a scenario where camera 316 captures, e.g., a sequence of images/frames reflecting that a particular bulb of a traffic signal (in the United States (based on location of vehicle 10)) is as follows: red-red-red-yellow-green-green. Based on this series of detections, optional bulbwise filter 324 may determine that the yellow determination is an outlier and thus, cannot be trusted. Thus, optional bulbwise filter 324 may negate or filter out the "yellow" detection in the "red-red-red-yellow-green-green" sequence of images, thus refining the output of raw messages 322 from bulb detector 320. However, and again, such filtering may be optional. Noise or false detections such as this can result from non-ideal environmental conditions, occlusions in the line of sight from camera 316 to the traffic signal, and/or other anomalous activity/objects/occurrences.

The raw messages 322 (whether filtered through optional bulbwise filter 324 or not) may be passed to post processor 328, where the raw messages 322 indicative of the current characteristics of the bulbs of a traffic signal detected by bulb detector 320 may be compared to "basic" traffic light bulb information 326 (again from map database 310). As alluded to above, traffic light bulbs may be grouped into bulb groups, or considered to be part of a bulb group defined, in some embodiments, based on the lane or vehicle transition that some set/subset of bulbs control. For example, a traffic light may include four bulbs, a red bulb, a yellow bulb, a green bulb, and a right arrow bulb. The red, yellow, and green bulbs may control a go-straight lane/vehicle transition at a particular intersection, while the red, yellow, and right arrow bulb may control a right turn lane of the same intersection. This type of information from map database 310 may be compared to detected bulb characteristics based on filtered or un-filtered raw messages 322 to arrive at a bulbwise detection. That is, the intersection of the bulbwise detection results and that of the map-based information can be determined to reinforce the bulbwise detection.

Returning again to FIG. 3A, at operation 304, temporal filtering may be applied to the current characteristics of each bulb in one or more bulb groups to refine the detected current characteristics. It should be understood this temporal filtering is applicable to a bulb group rather than an individual bulb (as is the case with optional bulbwise filter 324 described above). For example, considering the same scenario where camera 316 captures, e.g., a sequence of images/frames reflecting that a particular bulb of a traffic signal (in the United States (based on location of vehicle 10)) is as follows: red-red-red-yellow-green-green. Based on known bulb transitions in the United States, temporal filter 330 (FIG. 3B) may determine that a bulb transition regarding a bulb group from red to yellow is impossible (or at least highly unlikely) inasmuch as bulb colors in the United States follow a pattern that goes red-green-yellow-red-green-yellow and so on. Thus, temporal filter 330 may negate or filter out the "yellow" detection in the "red-red-red-yellow-green" sequence of images, thus refining the output detection from post processor 328. It should be understood that the aforementioned temporal filtering is an example of filtering in the context of bulb color/activation transitions, but other types of filtering may be included.

Ultimately, bulbwise detector messages 332 can be output to the autonomous control system 100 of vehicle 10, i.e. at operation 306, one or more bulb specific states regarding the one or more bulb groups are output. It should be understood that this output can be a simplified or streamlined version of the bulbwise detection output after post processor 328 performs the raw bulbwise detections and the map-based information comparison. For example, rather than output a plurality of bulbwise detection messages to autonomous control system 100, a simple go/no-go determination can be output for each bulb group, decreasing latency in generating autonomous control signals, and making autonomous control decisions easier.

Figure 4:
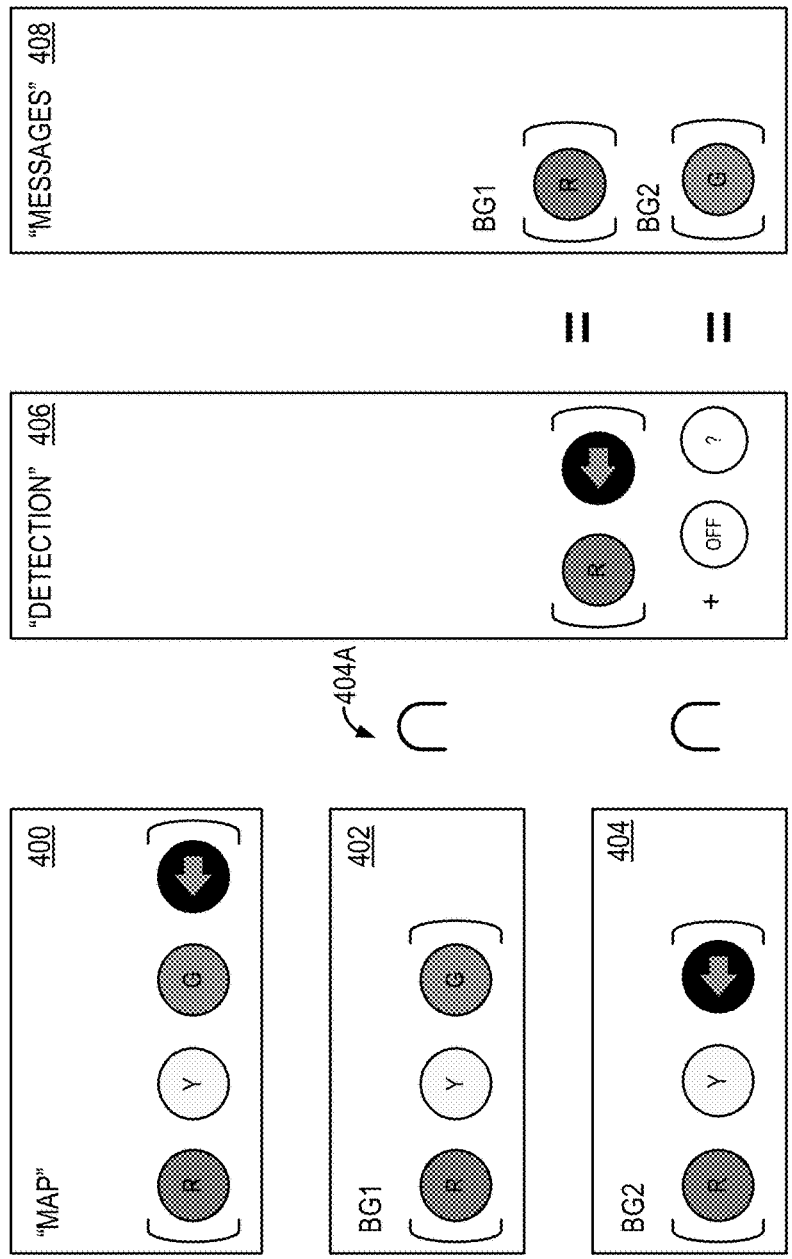
FIG. 4 illustrates an example of detecting current characteristics of a traffic light in accordance with one embodiment.

FIG. 4 illustrates an example of bulbwise detection in accordance with the bulbwise detection systems and methods described herein, such as bulbwise detector system 308 of FIG. 3B. In this example, map-based information (such as that from map database 310) may reveal that a particular traffic light 400 includes four bulbs, a red bulb "R," a yellow bulb "Y," a green bulb "G," and a left-arrow "←" bulb. According to map-based information, those four bulbs may be grouped into two bulb groups (BG), BG1 402 and BG2 404. Bulb group 402 may be applicable to a go-straight vehicle transition, a center lane of a section of roadway, etc., whereas bulb group 404 may control a right turn lane of that section of roadway.

However, map-based information alone cannot be used to determine a current state of each of these bulbs or bulb groups. That is, the map-based information may provide knowledge regarding a traffic light, e.g., that traffic light 500 comprises the four bulbs, R, Y, G, and F. However, being just map-based information, current characteristics, such as a current activation (active/non-active) state of each of those bulbs remains unknown without the bulbwise detection described herein.

Therefore, as described above. Bulbwise detection may be performed to derive/generate certain bulbwise detections. In this example, those bulb detections 406 may result in determinations that traffic light 400 currently indicates/shows an active red bulb and an active left (green) arrow bulb. The bulb detections 406 may include other determinations, e.g., that some other bulbs are "off," and/or unknown "?" bulb characteristics or states. Nevertheless, after comparison with the map-based bulb group information (BG1 402 and BG2 404 configurations gleaned from map-based information), and after performing temporal filtering (404A), it can be determined that the red bulb "R" indicates that a vehicle, e.g., vehicle 10 in the go-straight lane cannot proceed as the red bulb "R" controls that particular lane. Additionally, a determination can be made that the left green arrow bulb "←" indicates that a vehicle, e.g., vehicle 10, in the left turn lane can proceed with turning left. In other words, the detected characteristics of state of a bulb can be determined, and compared to the bulb group configuration to arrive at a controlling bulb state for each relevant bulb group. Moreover, simplified bulbwise detection messages 408 can be output to vehicle 10's autonomous control system 100 in the form a no-go (red "R") indication for BG1 402 and a go (green "G") indication for BG2 404. These messages may be used by autonomous control system to generate a navigation plan according to which, control unit 112 outputs, to the actuators 114, control signals for autonomously controlling vehicle 10.

Figure 5:
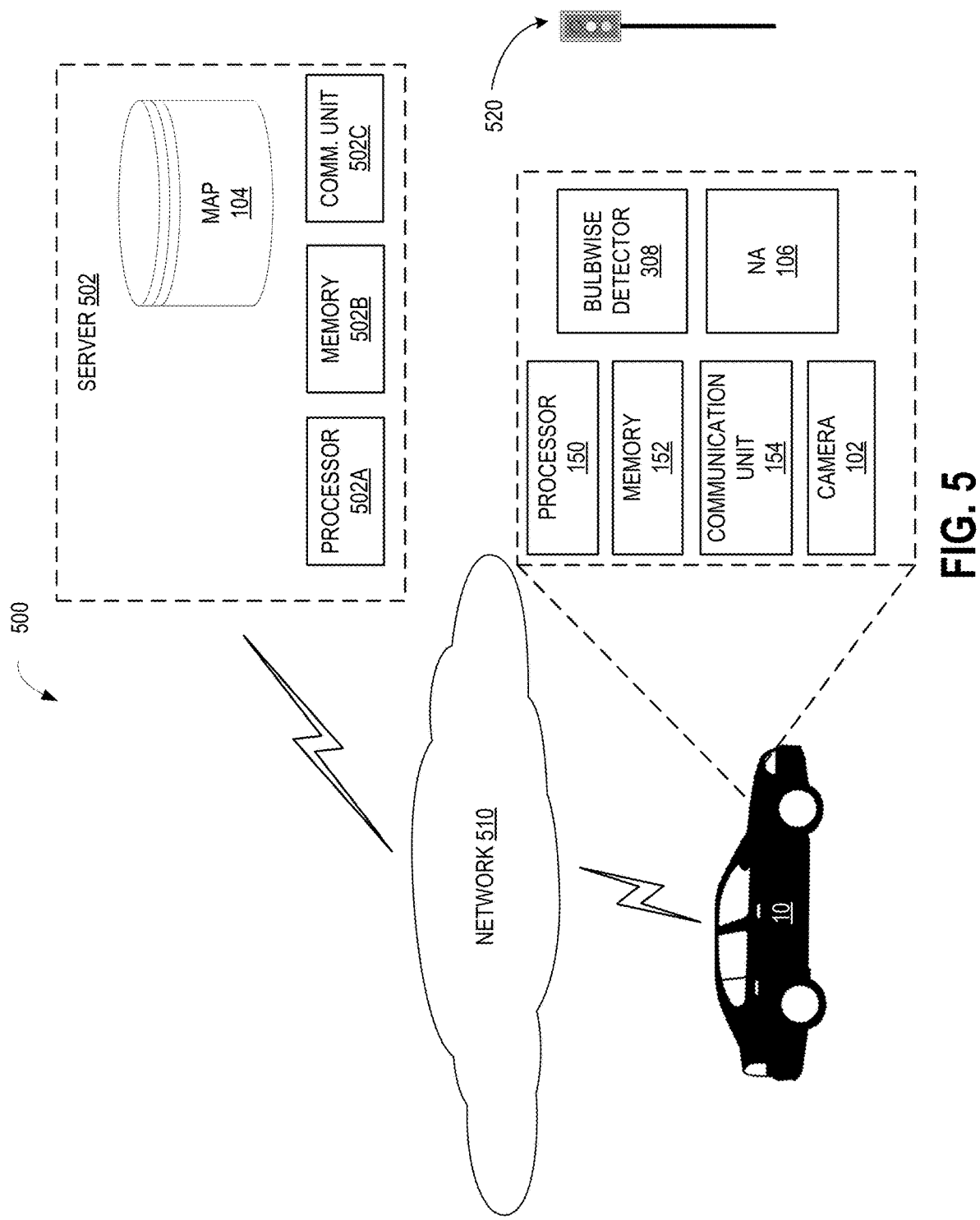
FIG. 5 illustrates an example traffic light detection and perception system in accordance with one embodiment.

FIG. 5 illustrates a system 500 and component parts of the system 500 for modeling/training using a hierarchical ontology to perceive traffic signals in accordance with one embodiment. System 500 includes a server 502, vehicle 10, and a network 510 over which vehicle 10 may communicate with server 502. It should be noted that in this embodiment, vehicle 10 may be traversing various roadways, and may encounter an object, such as traffic signal 520. As previously discussed, vehicle 10 may include one or more sensors 102, at least one of which may be a camera that can capture images of traffic signals, such as traffic signal 520. It should be understood that system 500 is an example, and system 500 in addition to other systems contemplated in accordance with the present disclosure may include additional and/or fewer components, may combine components, and/or divide one or more of the components into additional components, etc. For example, system 500 may include any number of vehicles and servers.

Network 510 can be a conventional type, wired or wireless, and may have numerous different configurations including a star configuration, token ring configuration, or other configurations. Furthermore, the network 510 may include one or more local area networks (LAN), wide area networks (WAN) (e.g., the Internet), public networks, private networks, virtual networks, peer-to-peer networks, and/or other interconnected data paths across which multiple devices may communicate. For instance, the network 510 may include a vehicle-to-vehicle network, a vehicle-to-infrastructure/infrastructure-to-vehicle network, etc.

The network 510 may also be coupled to or include portions of a telecommunications network for sending data in a variety of different communication protocols. In some embodiments, the network 510 includes BLUETOOTH® communication networks or a cellular communications network for sending and receiving data including via short messaging service (SMS), multimedia messaging service (MMS), hypertext transfer protocol (HTTP), direct data connection, wireless access point (WAP), email, etc. In some embodiments, the network 510 is a wireless network using a connection such as dedicated short-range communications (DSRC), wireless access in vehicular environment (WAVE), 802.11p, a 3G, 4G, 5G+ network, WiFi™, or any other wireless networks. Although FIG. 5 illustrates a single block for the network 510 that couples to the server 502 and to vehicle 10, it should be understood that the network 510 may in practice, comprise any number of combination of networks, as noted above.

The server 502 can include a hardware and/or virtual server that includes a processor 502A, a memory 502B, and network communication capabilities (e.g., a communication unit 502C). The server 502 may be communicatively coupled to the network 510. In some embodiments, the server 502 can send and receive data to and from vehicle 10 (as well as other servers, data repositories, and the like, e.g., map data from map database 104 of FIG. 1). It should be noted that server 502 may be an optional element of system 500. As also previously described above, vehicle 10 may have its own resident map database/map information from which basic traffic light information, e.g., location, may be obtained and used for comparison with currently detected traffic light (and more particularly, bulbs of the traffic light) characteristics.

Vehicle 10 includes a computing device having memory 152, a processor 150, and a communication unit 154. Processor 150 maybe an embodiment of ECU 150 (FIG. 1), or other suitable processor, which is coupled to other components of vehicle 10, such as one or more sensors, actuators, motivators, etc. Vehicle 10 may send and receive data to and from server 502.

In this example, traffic signal 520 may comprise a vertically-oriented traffic signal having three bulbs that upon illumination reflect the colors red, yellow, and green (from top to bottom). Memory 152 of vehicle 10 may capture data, e.g., images (video, still) or frames, captured by camera 102 of traffic signal 520, which may be provided to server 502 or to bulbwise detector 308, where bulbwise detection as described herein can be performed. Upon detecting/perceiving the state of the bulbs of traffic light 520, the state information can be output to autonomous control system 100, where, as described above, a navigation plan can be developed and ultimately used to generate control signals for autonomously controlling vehicle 10.

It should be understood that the embodiments described herein are non-limiting examples. For example, although example traffic light systems described herein include more "standard" traffic lights including circular light/bulb indicators, as well as arrow indicators, various embodiments may be adapted to perceive traffic light systems that display text (e.g., "STOP" or "PROCEED"), other shapes (e.g., pedestrian walk/no walk indicators, wildlife crossing warnings, railroad crossing indicators), and the like.

Figure 6:
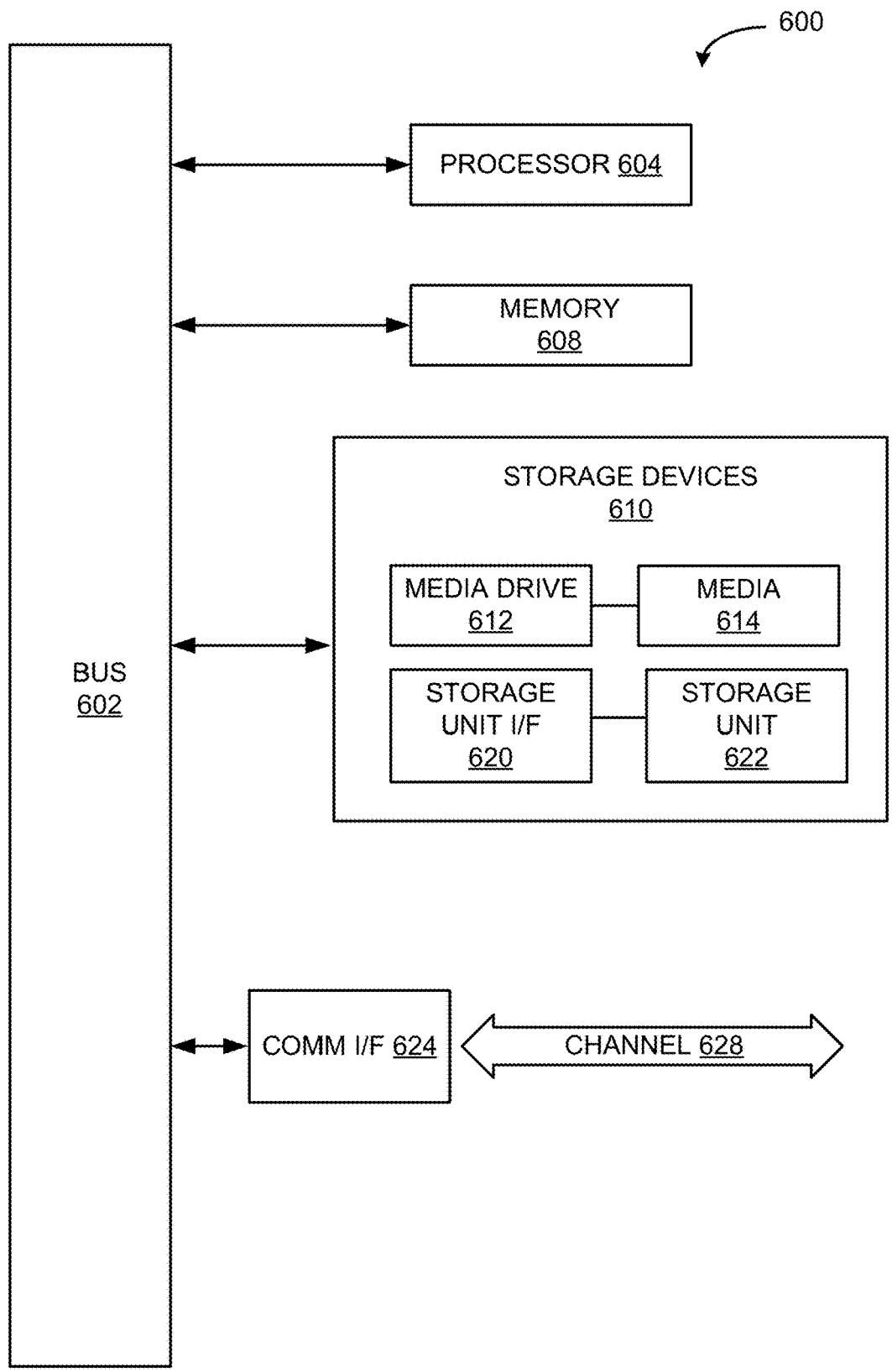
FIG. 6 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

Referring now to FIG. 6, computing component 600 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 600 might also represent computing capabilities embedded within or otherwise available to a given device. For example, a computing component might be found in other electronic devices such as, for example, portable computing devices, and other electronic devices that might include some form of processing capability.

Computing component 600 might include, for example, one or more processors, controllers, control components, or other processing devices. This can include a processor 604. Processor 604 might be implemented using a general-purpose or special-purpose processing engine such as, for example, a microprocessor, controller, or other control logic. Processor 604 may be connected to a bus 602. However, any communication medium can be used to facilitate interaction with other components of computing component 600 or to communicate externally.

Computing component 600 might also include one or more memory components, simply referred to herein as main memory 608. For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid-state drive, a magnetic tape drive, an optical drive, a compact disc (CD) or digital versatile disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot. Other examples may include a PCMCIA slot and card, and other fixed or removable storage units 622 and interfaces 620 that allow software and data to be transferred from storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method, comprising:
   generating images of a traffic light comprising a plurality of light emitting components;
   separately identifying each light emitting component of the plurality of light emitting components from the images;
   detecting current characteristics of each identified light emitting component based on the images;
   applying a light emitting component-specific filter to current characteristics of each identified light emitting component to refine accuracy of the current characteristics of each identified light emitting component;

deriving one or more light emitting component groups based on map-based information, each of the one or more light emitting component groups comprising one or more of the identified light emitting components;

temporally filtering the filtered current characteristics of each light emitting component in one or more light emitting component groups to refine the detected current characteristics; and outputting one or more light emitting component-specific states regarding the one or more light emitting component groups.

2. The method of claim 1, further comprising generating an autonomous vehicle navigation plan based on the one or more light emitting component-specific states.

3. The method of claim 1, wherein the generating of the images comprises projecting information regarding the traffic light from a high definition (HD) map onto a plurality of in-vehicle camera-captured images of the traffic light.

4. The method of claim 3, wherein the one or more light emitting component groups are defined in the HD map.

5. The method of claim 4, wherein the one or more light emitting component groups are defined relative to a lane or lanes of roadway controlled by the traffic light.

6. The method of claim 5, wherein the detecting of the current characteristics comprises determining a data intersection between each light emitting component of each of the one or more light emitting component groups and characteristics identified via the plurality of in-vehicle camera-captured images.

7. The method of claim 3, wherein the detecting of the current characteristics further comprises detecting at least one of a bounding box location, a color, a geometry, a flashing state, an angular direction, and an activation state.

8. The method of claim 1, wherein the temporally filtering of the current characteristics comprises applying a light emitting component group filter to filter out erroneously detected characteristics.

9. The method of claim 8, wherein the light emitting component group filter is designed based on regional traffic light color transitions.

10. The method of claim 1, wherein the outputting of the one or more light emitting component-specific states comprises a simplified light emitting component state upon which one or more autonomous control signals are based.

11. The method of claim 10, wherein the simplified light emitting component state comprises a go-no-go state for each of the one or more light emitting component groups.

12. A vehicle comprising:
a camera;
a light emitting component-specific detector, comprising:
a light emitting component detector component separately identifying each light emitting component of a plurality of light emitting components of a traffic light from images captured by the camera, and detecting current characteristics of each identified light emitting component based on the images captured by the camera;
a light emitting component-wise filter filtering out erroneous detected characteristics of each identified light emitting component;
a post processor deriving one or more light emitting component groups based on map-based information, each of the one or more light emitting component groups comprising one or more of the identified light emitting components, and translating the current characteristics of each light emitting component into light emitting component group-based characteristics;
a temporal filter filtering out erroneous predictions of the current characteristics; and
an autonomous control system receiving light emitting component-specific output messages from the light emitting component-specific detector upon which autonomous control signals for controlling the vehicle are based.

13. The vehicle of claim 12, further comprising a map database storing the map-based information including location information regarding the traffic light and bulb light emitting component group information regarding the traffic light.

14. The vehicle of claim 13, wherein the map-based information regarding the traffic light and light emitting component group information is overlaid onto the images captured by the camera to create image thumbnails for analysis by the light emitting component detector component for the detecting of the current characteristics of each light emitting component.

15. The vehicle of claim 13, wherein the post processor matches the current characteristics to each light emitting component of one or more light emitting component groups based on the light emitting component group information.

16. The vehicle of claim 12, wherein the temporal filter filters out erroneous light emitting component group-based characteristics in accordance with known traffic light translations particular to a region being traveled by the vehicle.

17. The vehicle of claim 12, wherein the light emitting component-specific detector outputs simplified light emitting component group-based characteristics to the autonomous control system.

18. The vehicle of claim 12, wherein the current characteristics comprise at least one of a bounding box location, a color, a geometry, a flashing state, an angular direction, and an activation state.

* * * * *